(12) United States Patent
Meckelburg et al.

(10) Patent No.: US 7,349,339 B2
(45) Date of Patent: Mar. 25, 2008

(54) METHOD FOR OPERATING AN AD-HOC NETWORK FOR THE WIRELESS DATA TRANSMISSIONS OF SYNCHRONOUS AND ASYNCHRONOUS MESSAGES

(75) Inventors: Hans-Jürgen Meckelburg, Wuppertal (DE); Michael Horn, Bottrop (DE)

(73) Assignee: 7 layers AG, Ratingen (DE)

( * ) Notice: Subject to any disclaimer, the term of this patent is extended or adjusted under 35 U.S.C. 154(b) by 839 days.

(21) Appl. No.: 10/450,690

(22) PCT Filed: Dec. 14, 2001

(86) PCT No.: PCT/EP01/14739

§ 371 (c)(1),
(2), (4) Date: Oct. 20, 2003

(87) PCT Pub. No.: WO02/49274

PCT Pub. Date: Jun. 20, 2002

(65) Prior Publication Data

US 2004/0063401 A1    Apr. 1, 2004

(30) Foreign Application Priority Data

Dec. 14, 2000   (DE) ................................ 100 62 303

(51) Int. Cl.
*H04L 12/26* (2006.01)
(52) U.S. Cl. .................................................... 370/235
(58) Field of Classification Search ....... 370/229–230.1, 370/235, 310, 343–345, 351, 400, 431, 436, 370/437, 442; 709/227, 228, 230–236
See application file for complete search history.

(56) References Cited

U.S. PATENT DOCUMENTS 5,987,011 A * 11/1999 Toh ............................ 370/331

(Continued)

FOREIGN PATENT DOCUMENTS

CA          2 302 501         2/2000

(Continued)

OTHER PUBLICATIONS

"Feasibility Questions of Synchronous Multi-hop Ad-hoc Networks" by Dániel Hollós- opinion dated Dec. 12, 2001—(German Priority Application).

(Continued)

*Primary Examiner*—Dmitry Levitan
(74) *Attorney, Agent, or Firm*—Collard & Roe, P.C.

(57) ABSTRACT

A method for operating an ad-hoc network for the wireless data transmission of synchronous and asynchronous messages synchronizes the transmitters and receivers of neighboring nodes on a transmission path using cyclically transmitted identifiers, whose intervals define a time frame. The nodes of the transmission path reserve time slots within the time frame for the transmission of data packets of a virtual connection that are to transmitted synchronously. A start signal is transmitted at the stars of the synchronous transmission of a virtual connection, the data packets are then transmitted in the previously defined time slots and the synchronous transmission is concluded by a stop signal. Free time slots in the nodes are filled with data packets that can be transmitted asynchronously, the packets being read from an output buffer memory of the node.

5 Claims, 4 Drawing Sheets

U.S. PATENT DOCUMENTS

Figure 1:
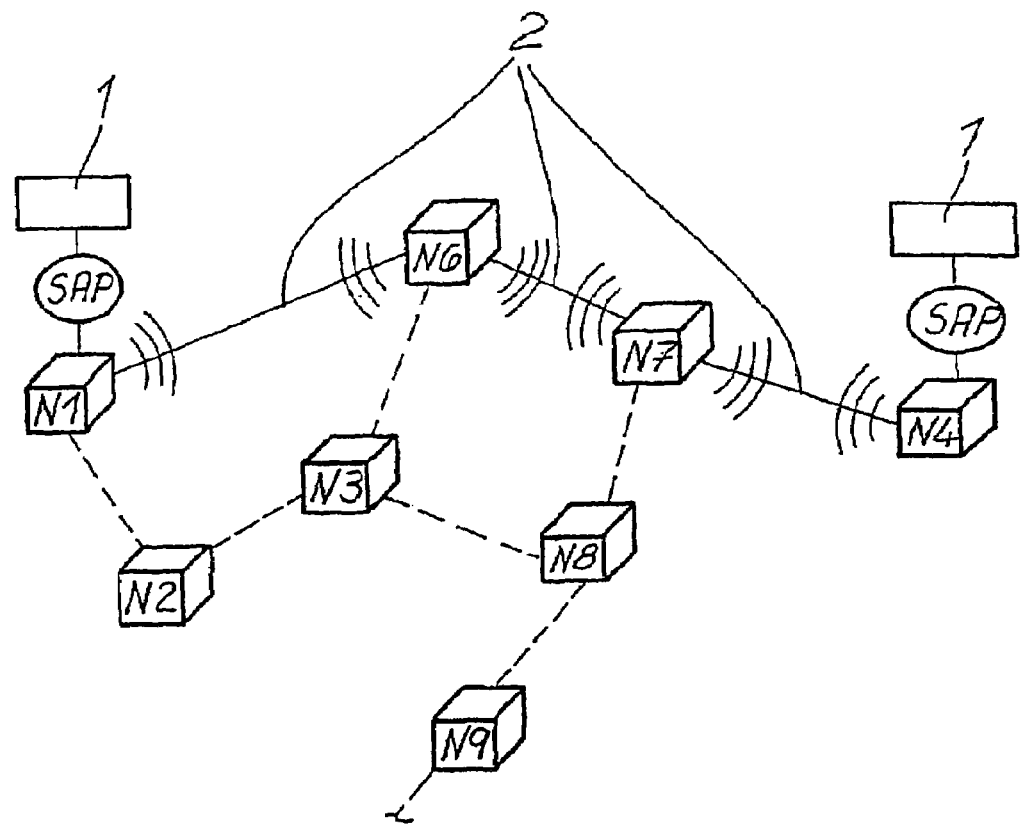

| | | | |
|---|---|---|---|
| 5,987,018 A * | 11/1999 | Freeburg et al. | 370/310.2 |
| 5,987,024 A | 11/1999 | Duch et al. | |
| 6,028,853 A * | 2/2000 | Haartsen | 370/338 |
| 6,590,928 B1 * | 7/2003 | Haartsen | 375/134 |
| 6,665,311 B2 * | 12/2003 | Kondylis et al. | 370/462 |
| 6,754,176 B1 * | 6/2004 | Gubbi et al. | 370/230 |
| 6,788,702 B1 * | 9/2004 | Garcia-Luna-Aceves et al. | 370/458 |
| 6,928,061 B1 * | 8/2005 | Garcia-Luna-Aceves et al. | 370/329 |
| 6,975,613 B1 * | 12/2005 | Johansson | 370/338 |
| 7,050,452 B2 * | 5/2006 | Sugar et al. | 370/465 |
| 7,114,010 B2 * | 9/2006 | Karaoguz et al. | 709/250 |
| 7,158,484 B1 * | 1/2007 | Ahmed et al. | 370/254 |
| 7,184,413 B2 * | 2/2007 | Beyer et al. | 370/254 |
| 2004/0095907 A1 * | 5/2004 | Agee et al. | 370/334 |

FOREIGN PATENT DOCUMENTS

| | | |
|---|---|---|
| DE | 197 37 897 | 3/1999 |
| EP | 0 999 717 | 5/2000 |

OTHER PUBLICATIONS

"The challenges of voice-over-IP-over wireless" by Göran AP Eriksson, et al, *Ericsson Review No. 1, 2000* pp. 20-31 (German Priority Application).

"Synchronisation of Fully Distributed Adhoc Multi-Hop Wireless Networks" by Dàniel Hollòs—*Technical University of Budapest, Department of Telecommunications*—three pages -(German Priority Application).

"Asynchronous Multimedia Multihop Wireless Networks", by Chunhung Richard Lin and Mario Gerla, *Computer Aided Design of Hig Performance Wireless Network Systems* 1997 IEEEE—pp. 118-125—Int'l. Search Rept.

"Bluetooth-The universal radio interface for ad hoc, wireless connectivity" by Jaap Haartsen. *Ericcson Review No. 3*, 1998, pp. 110-117—Int'l. Search Rept.

\* cited by examiner

PRIOR ART

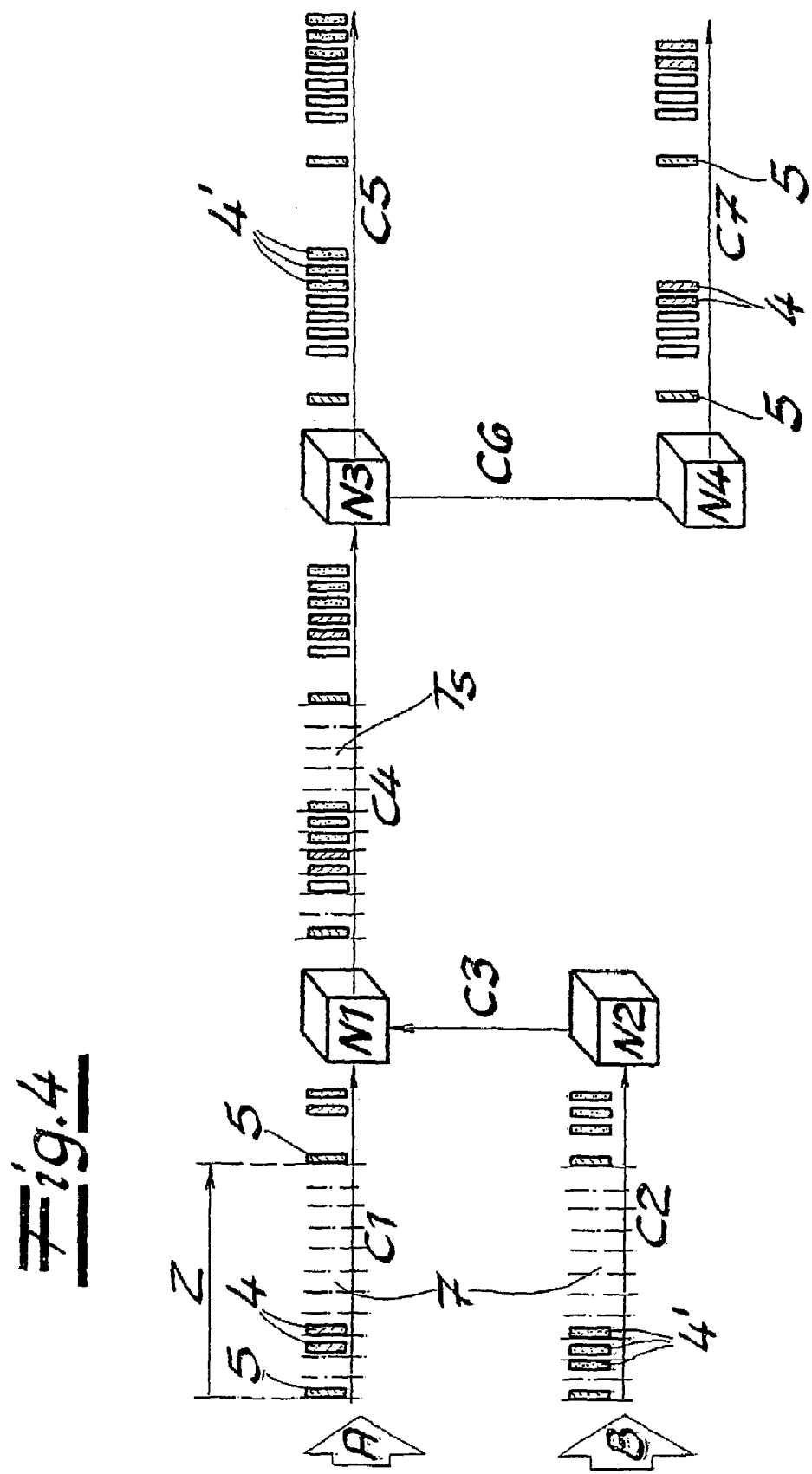

METHOD FOR OPERATING AN AD-HOC NETWORK FOR THE WIRELESS DATA TRANSMISSIONS OF SYNCHRONOUS AND ASYNCHRONOUS MESSAGES

CROSS REFERENCE TO RELATED APPLICATIONS

Applicants claim priority under 35 U.S.C. §119 of GERMANY Application No. 100 62 303.4 filed on 14 Dec. 2000. Applicants also claim priority under 35 U.S.C. §365 of PCT/EP01/14739 filed on 14 Dec. 2001. The international application under PCT article 21(2) was not published in English.

The invention relates to a method for operation of an ad hoc network for wireless transmission of synchronous and asynchronous messages, whereby the network is composed of network nodes that are distributed in any desired manner, each of which has a receiving device having an input controller, a switching station, and a transmitting device having an output controller, whereby transmission paths for logical connections to be transmitted from a starting node to a target node are established by way of intermediate nodes, according to a routing method, and whereby the nodes administer local address and control data (LCI) that are assigned to the logical connections and are reported to the preceding node of the transmission path.

An ad hoc network makes do without central network elements. It is formed by randomly distributed network nodes, which assure the data transmission. Every new node that is added is integrated into the network according to an established procedure, and the network organizes itself without any organizational sequences. The network nodes on the transmission path between a starting node and a target node take on the tasks of a transfer node having a switching station (switch). The nodes receive a message block (symbol vector) and transmit it to the next most advantageous node, until the message has finally been received at the target node.

In a method for the operation of an ad hoc network known from DE-C 197 37 897, the signals received by the nodes are transferred from the channel in question to a transmitting channel that is different from the former, whereby the transfer of the symbol stream that arrives at the receiving channel to the transmitting channel takes place symbol by symbol. Symbol-by-symbol transfer means that only a delay on the order of a symbol digit of the symbol stream is required at every node. The delay is connected with the fact that there is normally no synchronization of the symbol sequence on the incoming channels and the outgoing channels, so that a certain waiting time is required until the outgoing signal can be sent out in synchronization with the transmitting channels. The delay amounts to one to two symbol digits, which add up over the transmission path.

Furthermore, packet-by-packet transmission between the stations of a data transmission network is known from the Internet. Here, data are bundled in packets, which are transmitted by way of the most advantageous transmission path in each instance. Packet-by-packet transmission allows the transmission of large data amounts. However, rapid data transmission with a constant and small time delay is not assured.

The invention is based on the task of indicating a method for operation of an ad hoc network for wireless transmission, which can be used to very quickly and flexibly transmit data packets on the basis of the Internet protocol (IP) or the Asynchronous Transfer Mode Standard (ATM), in a linked network configuration.

Proceeding from a method with the characteristics as described initially, this task is accomplished, according to the invention, in that the transmitting and receiving devices of adjacent nodes of a transmission path are synchronized, using cyclically transmitted identifiers, the distances between which define a time frame, that the nodes of the transmission path reserve time slots within the time frame, for the transmission of data packets of a logical connection to be transmitted synchronously, whereby a start signal is sent at the beginning of a synchronous transmission of the logical connection, subsequently the data packets are transmitted in the previously determined time slots, and the synchronous transmission is concluded with a stop signal, and that free time slots in the nodes are filled up with data packets transmitted asynchronous, which are read out from an output buffer of the node.

According to a preferred embodiment of the invention, the data packets are transmitted in the form of symbol vectors that consist of a fixed, predetermined number of symbols transmitted in parallel, and a header for identification of the symbol vector. For one thing, the symbol vectors contain the data package having the maximum transmission size (Maximum Transmission Unit MTU) and a minimal header (Header) for identification of the symbol vector. Furthermore, the symbol vectors can also contain elements for signaling. The individual symbol vectors of the different logical connections are processed into the node, one after the other, and transmitted from one network node to another network node, preferably according to a frequency multiplex method that is known, as such, under the term Orthogonal Frequency Division Multiplex (OFDM). The symbol stream of the data and message blocks used for this purpose is divided up into a defined number of partial streams, which then are digitally modulated onto a corresponding number of carriers.

System-specific symbol vectors for synchronization of the transmitting and receiving devices of adjacent nodes are also transmitted in the established time frame. The system-specific symbol vectors carry a known sequence, e.g. M sequence, which is transmitted cyclically, and the distance between which forms the time frame, also called "hyperframe." The transmitting and receiving devices of the nodes can measure radio channel parameters with the M sequence, and adjust the modulation, as well as calculate and balance out synchronicity errors between the nodes. Furthermore, it is practical if a number of empty vectors is transmitted within the time frame, which are removed in a node, as needed, in order to eliminate synchronicity errors between the receiving and transmitting devices of adjacent nodes.

Error recognition and correction can take place using Forward Error Connection (FEC) measures, both by way of a symbol vector and by way of every symbol stream that runs in parallel.

The method according to the invention combines the advantages of network structures that work asynchronous with the advantages of network structures that work synchronously. While network structures that work asynchronous yield optimum results for packet-oriented applications, which have no time reference for data transmissions, real-time applications such as "Voice Over IP" or "Video On Demand" need the guarantee that the data packets are transmitted during a defined period of time, and that delays will not vary disproportionately. According to the invention, data packets that do not permit any disproportional delay are transmitted synchronously, whereby all the nodes of the network reserve appropriate time slots for the logical connection, in each instance, on the transmission path, by means of a routing method. After determination of the transmission path for a logical connection that is transmitted synchronously, a check is made as to whether the time slots required for the synchronous transmission are available on radio channels. All the nodes of the transmission path reserve the time slots, and report the address data and the reserved time slot to the preceding nodes. In the determination of the transmission path and the time slots for a connection that is to be transmitted synchronously, the case can occur that two independent logical connections coincidentally claim the same time slot between two nodes. In this case, a time delay is proposed at a node for one of the connections, whereby all the time delays of the transmission path, from the starting node to the target node, are added, and the sum of the time delay for the synchronous transmission is not allowed to exceed a predetermined value, preferably 150 milliseconds. If the limit value is adhered to, the constellation can be utilized. If the time delay is not acceptable, then the routing method must search for an alternative path, or must reject the request, so that synchronous data transmission is not established for the logical connection.

In the case of packet-oriented applications that have no time reference to the data transmission, the upcoming data packets are divided up into appropriately small symbol vectors. These symbol vectors are transmitted asynchronous, on a transmission path established by the routing method. In the case of asynchronous transmission, time delays at the nodes are considered acceptable.

According to the invention, free time slots that are not reserved for synchronous transmissions are filled up in the nodes with the symbol vectors that can be transmitted asynchronous. In this manner, the available network capacity can be fully utilized, without any impairment of the transmission speed of the time-critical data that must be transmitted synchronously.

The method according to the invention combines the advantages of asynchronous transmission technology, e.g. ATM, and synchronous transmission technology, e.g. Telekom Net, with the extraordinary advantages of a decentralized radio-based network structure.

Figure 2:
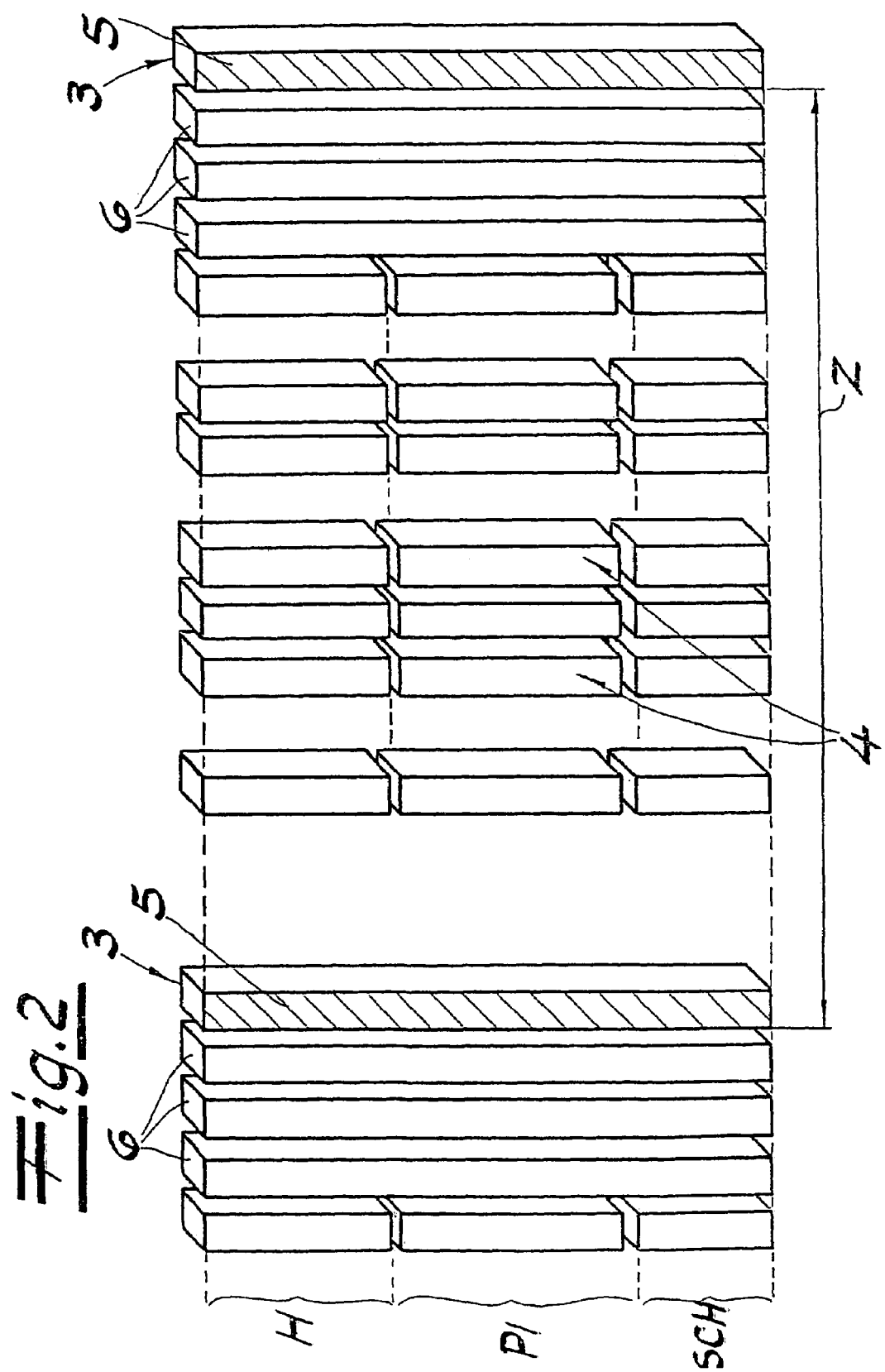
Figure 3:
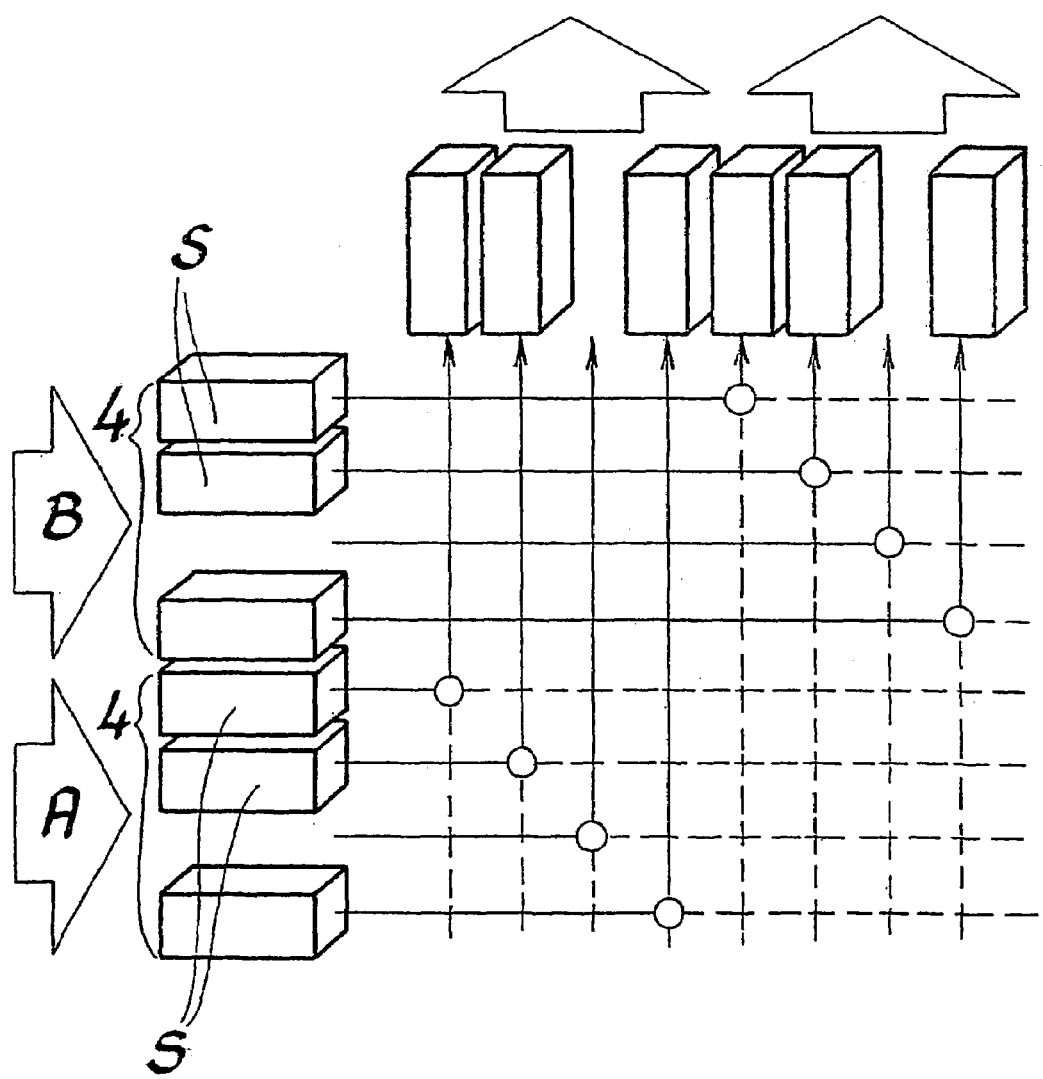

In the following, the invention will be explained using a drawing that shows an embodiment intended only as an example. The drawing schematically shows:

FIG. 1 the structure of an ad hoc network,

FIG. 2 the structure of the data packets transmitted according to the invention, FIG. 3 the transmission of the data packets at the nodes of the network, FIG. 4 the principle of data transmission according to the method according to the invention.

The network shown in FIG. 1 is composed of network nodes N that are distributed in any desired manner, each of which has a receiving device having an input controller, a switching station, and a transmitting device having an output controller. The network organizes the sequences itself, whereby additional nodes are integrated into the network according to an established procedure. The nodes N have defined service interfaces (SAP) for connecting different applications 1.

For a logical connection to be transmitted, the transmission path 2 from a starting node N1 to a target node N4 is established by way of intermediate nodes N6, N7, according to a routing method, whereby the nodes administer local address and control data (Local Connection Identifier LCI) that are assigned to the logical connections and are reported to the preceding nodes of the transmission path.

In the method according to the invention, the transmitting and receiving devices of adjacent nodes of a transmission path are synchronized using cyclically transmitted identifiers 3, the distances between which define a time frame Z. The data packets are transmitted according to a frequency multiplex method, in the form of symbol vectors 4, which consists of a fixed, predetermined number of symbols S transmitted in parallel, and a header (Header H) for identifying the symbol vector. The Payload region (PI) is available for transmission of the content data. Furthermore, the symbol vector can have an element SCH for signal control, which control is formed over several vectors and serves for signaling between two connected nodes (FIG. 2).

System-specific symbol vectors 5 for synchronization of the transmitting and receiving devices of adjacent nodes are also transmitted in the established time frame Z. The system-specific symbol vectors 5 carry a known sequence, e.g. M sequence, which is transmitted cyclically and the distance between which defines the time frame Z. The transmitting and receiving devices of the nodes can measure radio channel parameters with the M sequence, and adjust the modulation, as well as calculate and balance out synchronicity errors between the nodes. Furthermore, empty vectors 6 are built in within the time frame Z, which is also referred to as a "hyperframe." These carry no data and serve to balance out running time differences in the nodes. As needed, such empty vectors 6 are removed in a node, in order to eliminate synchronicity errors between the receiving and transmitting devices of adjacent nodes.

FIG. 3 shows that the symbol vectors 4 of logical connections A, B or a receiving channel that arrive at a node are switched to a transmitting channel that differs from the former, whereby the symbols $S_1 \ldots S_n$ that belong to a symbol vector 4 are switched further in parallel and transmitted.

The nodes of the transmission path reserve time slots within the time frame for the transmission of data packets of a logical connection to be transmitted synchronously, whereby a start signal is transmitted at the beginning of a synchronous transmission of the logical connection, subsequently the data packets are transmitted in the previously established time slots, and the synchronous transmission is interrupted with a stop signal. In the determination of a transmission path for a logical connection to be transmitted synchronously, a check is made as to whether the time slots required for the synchronous transmission are available on radio channels. All the nodes of the transmission path then reserve the time slots and report the address data and the reserved time slot to the preceding nodes. Depending on the system, several applications can competitively require radio resources at the same time, in an ad hoc network. Two independent logical connections can therefore coincidentally claim the same time slots between two nodes.

In the determination of the transmission path and the time slots for a connection to be transmitted synchronously, a time delay is proposed at a node if two independent logical connections between two nodes claim the same time slots, whereby all the time delays of the transmission path, from the starting node to the target node, are added, and the sum of the time delay for the synchronous transmission is not allowed to exceed the predetermined value. This will be explained using the example shown in FIG. 4.

The figure shows a typical implementation with two competitive applications. In the example, the application A is transmitting two symbol vectors 4 by way of nodes N1, N3, and N4, and the application B is transmitting three symbol vectors 4' by way of the nodes N2, N1, and N3. The time frames Z are synchronized, i.e. all the M sequence vectors are starting at the same time.

As a function of the system, the symbol vectors 4, 4' of the applications A and B cannot be transmitted on the channel C4 at the same time, therefore the application B is delayed in the node N1. For the constellation shown, there is a total of three delay units TS for the application A, and a total of four delay units TS for the application B.

FIG. 4 shows that free time slots 7 are available, which are not needed for data packets to be transmitted synchronously. These free time slots are filled up, in the nodes, with data packets to be transmitted asynchronously, which are read out from an output buffer of the nodes. The asynchronous data transmission, using free time slots, is utilized for all the packet-oriented applications that do not have any time reference to the data transmission. The synchronous transmission is reserved for real-time applications such as "Voice Over IP" or "Video On Demand." Here, the entire capacity of a symbol vector can be used for transmission of the content data.

The invention claimed is:

1. A method for the operation of an ad hoc network for wireless transmission of synchronous and asynchronous messages, where the network is composed of network nodes that are distributed in any desired manner, each of which has a receiving device having an input controller, a switching station, and a transmitting device having an output controller, where transmission paths for logical connections to be transmitted from a starting node to a target node are established by way of intermediate nodes, according to a routing method, and where the nodes administer local address and control data (LCI) that are assigned to the logical connections and are reported to a preceding node of the transmission path, wherein the messages are transmitted according to a frequency multiplex method, in the form of symbol vectors, which comprise a fixed, predetermined number of symbols transmitted in parallel, the transmitting and receiving devices of adjacent nodes of a transmission path are synchronized, using cyclically transmitted identifiers whose periodicities define a time frame, the nodes of the transmission path reserve time slots within the time frame, for transmitting symbol vectors of a logical connection to be transmitted synchronously, where a start signal is sent a synchronous transmission of the logical connection begins, subsequently data packets are transmitted in the reserved time slots, and the synchronous transmission is terminated by a stop signal, after determination of a transmission path for a logical connection to be transmitted synchronously, a check is made as to whether the time slots required for the synchronous transmission are available on radio channels, whether all the nodes of the transmission path reserve the time slots, and whether a preceding node reports the local address data and the reserved time slot, in the determination of the transmission path and the time slots for a connection to be transmitted synchronously, a time delay is proposed at a node whenever two independent logical connections between two nodes claim the same time slot, where all time delays of the transmission path, from the starting node to the target node, are added to obtain a total time delay, the total time delay for the synchronous transmission not being allowed to exceed a predetermined value, if the total time delay is less than or equal to the predetermined value, synchronous transmission is permitted for the connection and if the total time delay exceeds the predetermined value, synchronous transmission is not established for the connection, and any free time slots in the nodes are filled up with messages transmitted asynchronously, in a form of symbol vectors, each symbol vector having a respective header for identifying the symbol vector and being read out from an output buffer of the node.

2. The method according to claim 1, wherein system-specific symbol vectors for synchronization of the transmitting and receiving device of adjacent nodes along a transmission path are transmitted within the established time frame.

3. The method according to claim 2, wherein a number of empty vectors is transmitted within the time frame, which are removed in a node, as needed, in order to eliminate synchronicity errors between the receiving devices and transmitting devices of the adjacent nodes.

4. The method according to claim 1, wherein an error recognition and correction via a symbol vector or via a symbol stream that is transmitted in parallel takes place.

5. The method according to claim 1, wherein the symbol vectors of a receiving channel that arrive at a node are switched to a transmitting channel that is different from the receiving channel, where the symbols associated with a symbol vector are forwarded and transmitted in parallel.

* * * * *